United States Patent
Yamaguchi et al.

(10) Patent No.: US 6,638,051 B2
(45) Date of Patent: Oct. 28, 2003

(54) EXTRUSION MOLDING MACHINE FOR PRODUCING CERAMIC MOLDING

(75) Inventors: Satoru Yamaguchi, Anjo (JP); Hiromi Katou, Kuwana (JP)

(73) Assignee: Denso Corporation (JP)

( * ) Notice: Subject to any disclaimer, the term of this patent is extended or adjusted under 35 U.S.C. 154(b) by 77 days.

(21) Appl. No.: 09/941,664

(22) Filed: Aug. 30, 2001

(65) Prior Publication Data

US 2002/0036948 A1 Mar. 28, 2002

(30) Foreign Application Priority Data

Aug. 30, 2000 (JP) ........................................ 2000-261457
Jul. 10, 2001 (JP) ........................................ 2001-209341

(51) Int. Cl.[7] ........................... B29C 47/60; B29C 47/64
(52) U.S. Cl. ..................... 425/204; 366/76.3; 425/208; 425/382.4
(58) Field of Search ................. 425/204, 205, 425/208, 382.4; 366/76.3, 76.4

(56) References Cited

U.S. PATENT DOCUMENTS

| | | | | |
|---|---|---|---|---|
| 3,734,472 A | * | 5/1973 | Strohmeier | 366/76.4 |
| 3,744,770 A | * | 7/1973 | Ocker et al. | 366/82 |
| 3,782,700 A | * | 1/1974 | Wittrock | 366/76.4 |
| 3,981,658 A | * | 9/1976 | Briggs | 425/205 |
| 4,764,020 A | * | 8/1988 | Moriyama | 366/76.4 |
| 5,577,839 A | * | 11/1996 | Brams et al. | 366/76.3 |
| 6,299,340 B1 | * | 10/2001 | Lu et al. | 366/76.3 |

FOREIGN PATENT DOCUMENTS

| | | |
|---|---|---|
| JP | 47-43154 | 12/1972 |
| JP | 55-159956 | 12/1980 |
| JP | 6-64020 | 3/1994 |

* cited by examiner

Primary Examiner—James P. Mackey
Assistant Examiner—Joseph Leyson
(74) Attorney, Agent, or Firm—Nixon & Vanderhye PC

(57) ABSTRACT

An extrusion molding machine for producing a ceramic molding is provided in which a ceramic material which has not been kneaded is efficiently introduced to realize a high molding speed. The machine includes a screw extruder and a material introduction portion through which the material is introduced into the screw extruder. The material introduction portion is provided with a casing having an introduction passage connected to a housing of the screw extruder and an opening through which the material is charged, and right and left introduction screws provided in the introduction passage. The introduction screws are provided with lead portions wound in opposite directions and arranged so that the lead portions are engaged substantially in a non-contact state. The introduction screws are rotated so that the material is moved in a direction opposite to the opening at the engagement portion.

9 Claims, 10 Drawing Sheets

EXTRUSION MOLDING MACHINE FOR PRODUCING CERAMIC MOLDING

BACKGROUND OF THE INVENTION

1. Field of the Invention

The present invention relates to an extrusion molding machine for extruding a ceramic molding.

2. Description of the Related Art

For instance, a known catalyst carrier for an exhaust gas purifier for an automobile is comprised of a ceramic honey-comb structure 8 having a number of cells 88 spaced by separation walls 81, as shown in FIG. 19. In general, a ceramic molding such as the ceramic honey-comb structure 8 is formed by extrusion molding. Moreover, the extrusion molding can be also used to form a sheet-like ceramic product, i.e., a ceramic sheet.

A conventional extrusion molding machine 9 is comprised of, for example, a molding die 11 for forming the ceramic molding 8, and two-stage screw extruders 2 and 3 for continuously kneading and extruding the ceramic material 80, as shown in FIG. 17. Note that the two-stage screw extruders can be replaced with a single-stage screw extruder or more than two-stage screw extruders.

As can be seen in the drawing, the screw extruders 2 and 3 are respectively provided with housings 21 and 31 which define material passageways 20 and 30 in which screws 22 and 32 having shaft portions 221 and 321 and helical leads 222 and 322 formed therearound extend.

A material introduction portion 93 through which the ceramic material 80 is introduced is provided above the rear end of the upper stage screw extruder 3. The material introduction portion 93 is provided with a hopper 939 through which the material is fed and a pair of right and left feed rollers 931. As shown in FIG. 18, the right and left feed rollers 931 are opposed to each other and are rotated in opposite directions (in the downward direction at the opposed surface portions), so that the ceramic material 80 dropped onto the feed rollers 931 is forced between the feed rollers 931 and fed downward.

As shown in FIG. 17, in case of the two-stage screw extruders 2 and 3, a vacuum chamber 5 is provided between the screw extruders. The vacuum chamber 5 is adapted to degas the ceramic material 80 which has been kneaded by the upper stage screw extruder 3 and to feed the ceramic material 80 having a high bulk density to the lower stage screw extruder 2. The vacuum chamber 5 is also provided therein with a pair of right and left feed rollers 921 similar to those of the material introduction portion 93, so that the ceramic material 80 can be fed to the lower stage screw extruder 2.

To produce the ceramic molding 8 using the extrusion molding machine 9, the ceramic material 80 which is not kneaded is charged into the material introduction portion 93 from the hopper 939, as shown in FIG. 17. The ceramic material 80 is forced between the pair of right and left feed rollers 931 in accordance with the rotation thereof and is fed into the screw extruder 3.

Thereafter, the ceramic material 80 is fed forward while being kneaded by the upper stage screw extruder 3 and is discharged from the front end thereof into the vacuum chamber 5. Thereafter, the ceramic material 80 which has been kneaded to some extent is degassed in the vacuum chamber 5 and is fed into the lower stage screw extruder 2 by the pair of right and left feed rollers 921. The ceramic material 80 is moved forward while being further kneaded in the screw extruder 2, and is extruded from the extrusion molding die 11 through a resisting pipe 12 to obtain the ceramic molding 8.

The extrusion molding machine of the prior art mentioned above has the following drawbacks.

Namely, to enhance the productivity by increasing the molding speed in the extrusion molding machine 9, it is necessary to increase the amount of the ceramic material 80 to be charged in the material introduction portion 93 per unit time and to increase the rotation speed of the feed rollers 931.

However, the material introduction portion 93 can respond only to a certain amount of increase in the amount of the material to be fed, so that feed of the ceramic material 80 into the screw extruder 3 may be stopped. Concretely, if a large amount of the ceramic material 80 is charged in the material introduction portion 93, the feed rollers 931 having projections and depressions idle-rotate with the surfaces thereof having part of the ceramic material stuck thereto. Consequently, as can be seen in FIG. 18, the ceramic material 80 cannot be fed downward and deposit of the ceramic material 80 can be produced above the feed rollers 931. Therefore, the increase in the molding speed is limited in the conventional extrusion molding machine 9 and, hence, it is difficult to enhance the productivity sufficiently.

One of the reasons can be considered as follows.

Namely, the ceramic material 80 which is not kneaded is charged in the material introduction portion 93 and is usually in a state of mixture of powders of a plurality of ceramic components and water mixed therewith like a clod and contains plenty of air. Thus, the ceramic material 80 in the material introduction portion 93 has a very low bulk density. Therefore, the ceramic material 80 tends not to drop due to the dead weight, thus leading to production of the deposit mentioned above.

SUMMARY OF THE INVENTION

It is an object of the present invention to provide an extrusion molding machine for producing a ceramic molding, in which the ceramic material which is not kneaded can be efficiently introduced to increase the molding speed.

To achieve the object mentioned above, according to an embodiment of the present invention, there is provided an extrusion molding machine for producing a ceramic molding, comprising a screw extruder having a housing and an extruding screw incorporated in the housing and provided with a shaft portion and a lead portion spirally wound about the shaft portion, and a material introduction portion which is adapted to introduce a ceramic material into the screw extruder, wherein the material introduction portion is provided with a casing which has an introduction passage connected to the inside of the housing of the screw extruder and an opening through which the ceramic material is charged, and a pair of right and left introduction screws provided in the introduction passage, said introduction screws being provided with lead portions wound in opposite directions and being arranged so that the lead portions are engaged substantially in a non-contact state, said introduction screws being rotated so that the ceramic material is moved in a direction opposite to the opening at the engagement portion.

In this embodiment, one of the significant features resides in that the material introduction portion is comprised of the casing and the pair of introduction screws.

The casing defines therein the introduction passage in which the pair of right and left introduction screws are provided, as mentioned above. The opening of the casing preferably opens at the rear end side of the engagement portion of the right and left introduction screws (side opposite to the feed direction of the introduction screws). With this arrangement, the charged ceramic material can be smoothly fed to the introduction screws. The position of the material introduction portion can be modified in various ways as explained later.

The effects of the embodiment of the invention will be discussed below.

The extrusion molding machine according to the embodiment of the invention is provided with the material introduction portion constructed as above. Consequently, even if a larger amount of ceramic material is charged in the material introduction portion, the ceramic material can be smoothly fed to the screw extruder. Therefore, the molding speed can be remarkably increased, in comparison with the prior art.

Namely, the material introduction portion is provided with two interengageable introduction screws which are rotated in opposite directions so as to draw and feed the ceramic material therein. Therefore, the ceramic material charged in the engagement portion of the two introduction screws is smoothly fed in a direction opposite to the opening while being loosened by the lead portions of the introduction screws even if the material is not kneaded and has a very low bulk density. The material is forced forwardly by the rotation of the introduction screws. Consequently, the charged ceramic material is successively fed in the introduction passage of the casing without being deposited above the introduction screws, and is introduced in the housing of the screw extruder. Therefore, in this embodiment, the amount of material to be charged in the material introduction portion per unit time can be remarkably increased, in comparison with the prior art.

As may be understood from the foregoing, according to the present invention, an extrusion molding machine for producing a ceramic molding in which the ceramic material which has not been kneaded can be effectively introduced to obtain high molding speed can be provided.

In a preferred embodiment of the invention, each pair of introduction screws is in the form of a cone whose diameter is gradually reduced toward the front end thereof. With this structure, the introduction passage may be gradually reduced in volume toward the front end, i.e., toward the screw extruders. Consequently, the pressure of the ceramic material to be charged can be increased during passing in the introduction passage. Therefore, the ceramic material can be more smoothly fed to the screw extruders due to the increased pressure.

According to another preferred embodiment of the invention, the lead portions of the introduction screws have pitches of turns which are gradually reduced toward the front ends thereof. In this embodiment, the pressure of the ceramic material can be increased toward the front end of the introduction screws. Therefore, the ceramic material can be more smoothly fed to the screw extruder.

In a preferred embodiment of the invention, the introduction passage of the material introduction portion is connected to the inside of the housing at a side portion of the screw extruder. In this embodiment, it is possible to arrange the introduction passage and the introduction screws substantially in the horizontal direction. Furthermore, the front ends of the introduction screws can be located close to the screw extruders. Consequently, a drawback such as pressure drop can be restricted.

The introduction passage of the material introduction portion can be connected to the inside of the housing at an upper portion of the screw extruder. In this arrangement, the freedom of design of the positional relationship between the material introduction portion and the screw extruders can be enhanced. This arrangement could contribute to reduction of the necessary accommodation space.

In a preferred embodiment, the width W of the opening of the introduction passage connected to the housing of the screw extruder is not less than pitch P of the adjacent threads of the lead portions of the extruding screws. Consequently, the transfer of the ceramic material from the introduction passage to the extruding screws can be smoothly carried out.

According to another aspect of the invention, there is provided an extrusion molding machine for producing a ceramic molding, comprising a screw extruder having a housing and an extruding screw incorporated in the housing and provided with a shaft portion and a lead portion spirally wound about the shaft portion, and a material introduction portion which is adapted to introduce a ceramic material into the screw extruder, wherein the material introduction portion is provided with a casing which has an introduction passage connected to the inside of the housing of the screw extruder and an opening through which the ceramic material is charged, and a single introduction screw provided in the introduction passage, the introduction screw being in the form of a cone whose diameter is gradually reduced toward the front end thereof and being provided with a lead portion wound in a direction opposite to the lead portion of the extruding screw, the introduction screw being arranged, so that the lead portion of the introduction screw is engaged by the lead portion of the extruding screw substantially in a non-contact state, the introduction screw and extruding screw being rotated so that the ceramic material is moved in a direction opposite to the opening at the engagement portion.

One of the most significant features of this embodiment resides in that the single introduction screw having a special shape constitutes, in combination with the extruding screw of the screw extruder, the material introduction portion.

With this embodiment, the same effects as those expected from the use of the two introduction screws mentioned above can be obtained. The single introduction screw makes the material introduction portion simple and compact. Note that in this embodiment, the effective length of the extruding screw of the screw extruder is resultingly shortened and, hence, designs should be made taking this point into account.

In a preferred embodiment of the invention, the ceramic material is a material of which cordierite is made. The ceramic material of which cordierite is made is a mixture of power of the components and an appropriate amount of moisture. In the mixture, before kneaded, the powder and the moisture are mixed in a clod state, and the mixture contains a large amount of air. Therefore, the bulk density of the mixture is very low. Consequently, in the case that the material of which cordierite is made is extruded, the above-mentioned effects can be effectively brought out.

In a preferred embodiment, baffle members are provided in the introduction passage of the material introduction portion, the baffle members projecting inward from the casing so that the baffle members are located between the threads of the lead portions of the introduction screw. In this embodiment, the baffle members can scrape the ceramic material existing between the lead portions. Consequently, it is possible to prevent the ceramic material from remaining between the lead portions. Thus, the ceramic material can be certainly fed forward.

The baffle members can be of any shape, and are in the form of, for example, a circular rod or a square rod, etc. The baffle members can be made of various materials, such as a flexible rubber or highly rigid metal.

In another preferred embodiment of the invention, assuming that the height of the threads of the lead portion is H, the overlapping length L of the baffle members and the lead portion, as viewed in the axial direction of the introduction screw, is in the range between 0.1 H and 0.8 H. If L is smaller than 0.1 H, there is a possibility that no effect of the baffle members to scrape the ceramic material existing between the lead portions can be obtained. If L is greater than 0.8 H, there is a possibility that the propelling force for moving the ceramic material caused by the rotation of the introduction screw is reduced.

In a preferred embodiment of the invention, the baffle members are spaced at a distance equal to the pitch of the adjacent threads of the lead portion. With this arrangement, ceramic material existing between the lead portions can be more certainly scraped.

BRIEF DESCRIPTION OF THE DRAWINGS

The present invention will be more clearly understood from the description as set below with reference to the accompanying drawing, wherein.

DESCRIPTION OF THE PREFERRED EMBODIMENTS

<First Embodiment>

An embodiment of an extrusion molding machine for producing a ceramic molding according to the present invention will be discussed below with reference to FIGS. 1 through 4.

Figure 1:
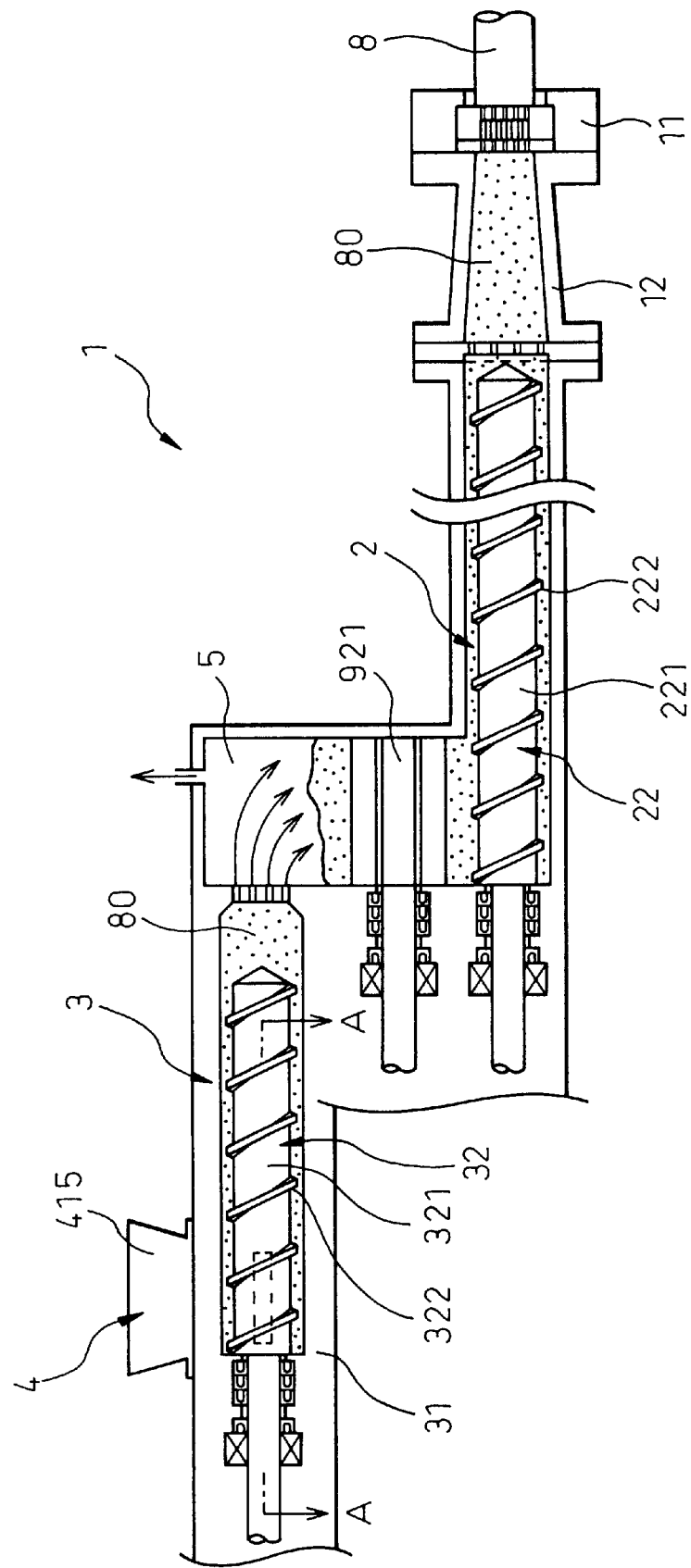
FIG. 1 is a view showing the entire structure of an extrusion molding machine according to a first embodiment of the invention.

As shown in FIG. 1, an extrusion molding machine 1 for producing a ceramic molding 8 according to the present invention is comprised of a screw extruder 3 having a housing 31 and an extruding screw 32 incorporated in the housing and made of a shaft portion 321 and a helical lead 322 wound around the shaft portion 321, and a material introduction portion 4 by which the ceramic material is fed to the screw extruder 3.

Figure 2:
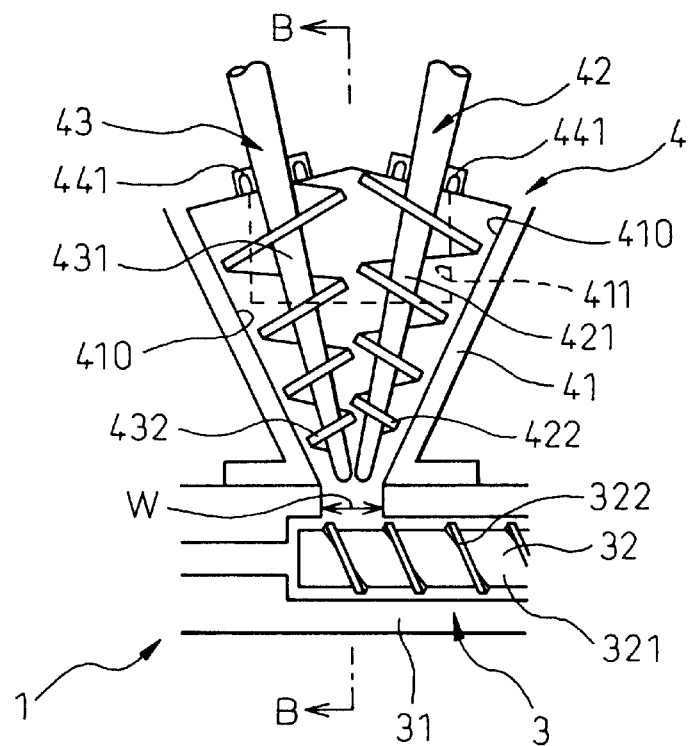
FIG. 2 is a sectional view taken along the line A—A in FIG. 1.
Figure 3:
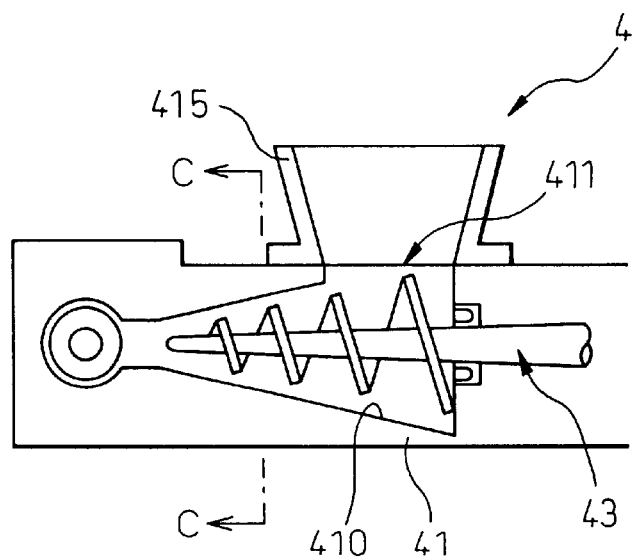
FIG. 3 is a sectional view taken along the line B—B in FIG. 2.

As shown in FIGS. 2 and 3, the material introduction portion 4 is comprised of a casing 41 having an introduction passage 410 connecting to the inside of the housing 31 of the screw extruder 3 and an opening 411 through which the ceramic material is charged, and a pair of right and left introduction screws 42 and 43 arranged in the introduction passage 410 in the casing 41.

The introduction screws 42 and 43 are provided with leads 422 and 432 which are wound in opposite directions, and are arranged so that the leads 422 and 432 are engaged with each other in a non-contacting state. The screws 42 and 43 rotate in the downward direction at the interengaging portions (to feed the ceramic material in the direction away from the opening 411). This will be discussed below in more detail.

The extrusion molding machine 1 of the invention is comprised of a combination of the upper stage screw extruder 3 and a lower stage screw extruder 2 and a vacuum chamber 5 between the screw extruders. The lower stage screw extruder 2 is provided on its front end with a molding die 11 through a resisting pipe 12. The material introduction portion 4 is located on the side of the upper stage screw extruder 3 at the rear end thereof.

Figure 4:
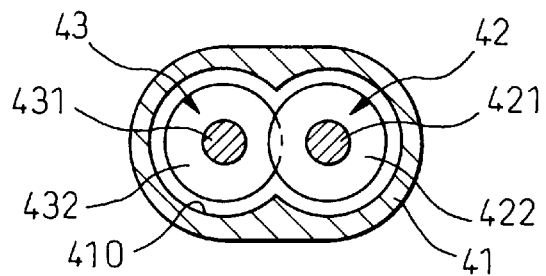
FIG. 4 is a sectional view taken along the line C—C in FIG. 3.

As can be seen in FIGS. 2 through 4, the material introduction portion 4 is comprised of the casing 41 having the introduction passage 410 and the opening 411 and a pair of right and left introduction screws 42 and 43 provided in the introduction passage 410.

As shown in FIGS. 2 and 3, each of the introduction screws 42 and 43 is in the form of a cone whose diameter is gradually reduced toward the front end thereof. Concretely, the shaft portions 421 and 431 whose diameter is slightly reduced toward the front ends are provided with leads 422 and 432 spirally wound about the shaft portions so as to define a conical shape. The pitches of the turns of the leads 422 and 432 are reduced toward the front ends of the shaft portions.

As shown in FIG. 2, the two introduction screws 42 and 43 are arranged so that the leads 422 and 432 are engaged with each other in a non-contacting state. The shaft portions 421 and 431 are connected to a drive means (not shown)

through seal members 441, etc. The introduction screws 42 and 43 rotate in opposite directions, so that they rotate in the downward direction at the interengaging portions thereof, as described above.

As can be seen in FIG. 4, the introduction passage 410 formed in the casing 41 has a cross-sectional shape consisting of two circles which are partly overlapped so as to surround the peripheries of the introduction screws 42 and 43. The space between the outer shape of the introduction screws 42, 43 and the casing 41 is substantially uniform. The introduction passage 410 is connected to the inside of the housing 31 from one lateral side of the screw extruder 3. The width W of the opening at the connection to the housing 31 is slightly greater than the pitch P of the adjacent threads of the lead 322 of the extruding screw 32.

The casing 41 is provided with a square opening 411 and an inverted square pyramid-shaped projection 415 located above the opening 411, as shown in FIGS. 2 and 3.

Figure 19:
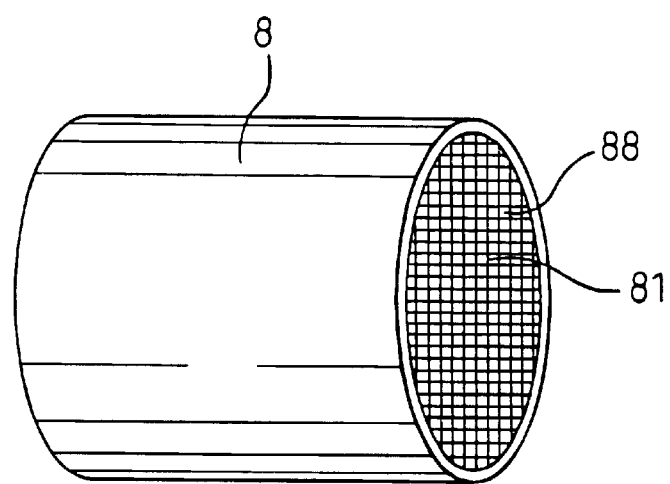
FIG. 19 is a view showing a honey-comb structure in the prior art.

The ceramic molding produced by the present invention is a honey-comb structure 8 as shown in FIG. 19. To this end, the molding die 11 is provided with grid-like slits. The resisting pipe 12, the lower stage screw extruder 2, and the vacuum chamber 5 are the same as those in the prior art. The feed rollers 921 similar to those in the prior art are provided in the vacuum chamber 5.

The honey-comb structure 8 was actually produced using the extrusion molding machine 1 constructed as above.

First of all, the ceramic material 80 for the honeycomb structure 8 was prepared. The ceramic material 80 was made of a mixture of powders of ceramic components and water. It should be noted that the ceramic material 80 was not kneaded and, hence, the ceramic powders and water were not uniformly mixed but were rather gathered in the form of a cluster of small masses as like clods. The ceramic material contained a large quantity of air, so that the bulk density thereof was very small. In general, the bulk density of the ceramic material to be extruded by the extrusion molding machine 1 to produce the ceramic molding is less than 0.8 g/cm$^3$.

The ceramic material 80 mentioned above was charged into the casing 41 through the opening 411 to carry out the extrusion molding. As a result, it was possible to continue a smooth extrusion molding in spite of the fact that a larger amount of ceramic material 80 was charged in the material introduction portion 4. Concretely, in the conventional feed roller type material introduction portion, it was only permitted to charge the amount of material up to approximately 350 kg/Hr, but in the extrusion molding machine 1 of the invention, it was possible to increase the amount of material to approximately 1000 kg/Hr.

Namely, in the material introduction portion 4 of the invention, as described above, the two introduction screws 42 and 43 are arranged in an engaged state and are rotated in opposite directions so as to feed or force the material inward. Therefore, the ceramic material 80 charged in the engaging portion of the two introduction screws 42 and 43 is can be smoothly fed downward, while being loosened by the leads 422 and 432 of the introduction screws 42 and 43 even though the bulk density is very low. The ceramic material is moved and fed forward in accordance with the rotation of the introduction screws 42 and 43.

In the illustrated embodiment, since the introduction screws 42 and 43 are conical, the introduction passage 410 in the casing 41 is reduced in volume toward the front end thereof, i.e., toward the screw extruder 3. Therefore, the pressure of the ceramic material is gradually increased during the passing thereof in the introduction passage, so that the ceramic material can be smoothly fed to the screw extruder 3.

Consequently, the ceramic materials 80 which are successively charged in the material introduction portion are moved in the introduction passage 410 of the casing 41 without being deposited above the introduction screws 42 and 43 and are introduced in the housing 31 of the screw extruder 3.

The ceramic material 80 is moved forward while being kneaded by the upper stage screw extruder 3 and is extruded from the front end thereof into the vacuum chamber 5. Thereafter, the ceramic material 80 which has been kneaded to some extent is degassed in the vacuum chamber 5 and is thereafter fed into the lower stage screw extruder 2 by the pair of right and left feed rollers 921. The ceramic material 80 is further kneaded in the screw extruder 2 and is moved forward and extruded from the molding die 11 through the resisting pipe 12 to obtain a honey-comb structure 8.

As can be seen from the foregoing, according to the embodiment of the invention, the amount of material to be charged into the material introduction portion 4 per unit time can be remarkably increased in comparison with the prior art.

Consequently, the molding speed of the honey-comb structure 8 can be increased, thus resulting in an enhancement of the productivity.

<Second Embodiment>

Figure 5:
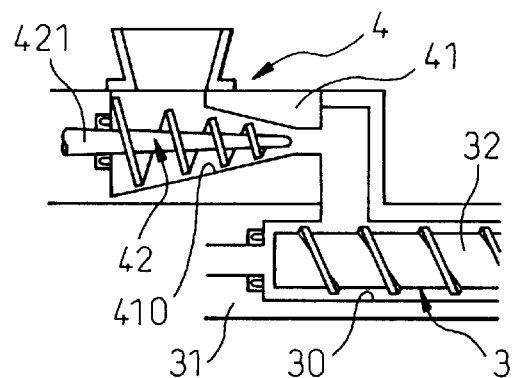
FIG. 5 is a view showing an arrangement of a material introduction portion according to a second embodiment of the present invention.

In the second embodiment, the arrangement of the material introduction portion 4 and the connection of the introduction passage 410 to the housing 31 in the first embodiment are modified, as shown in FIG. 5. Namely, in the second embodiment, the introduction passage 410 of the material introduction portion 4 is connected to the housing 31 at the upper portion of the screw extruder 3, as can be seen in FIG. 5.

The shaft portion 421 (431) of the introduction screw 42 (43) extends in the horizontal direction and the engaging portion of the introduction screws is located above the axis of the extruding screw 32. The remaining structure of the second embodiment is the same as that of the first embodiment.

The same effects as those of the first embodiment can be obtained from the second embodiment.

<Third Embodiment>

Figure 6:
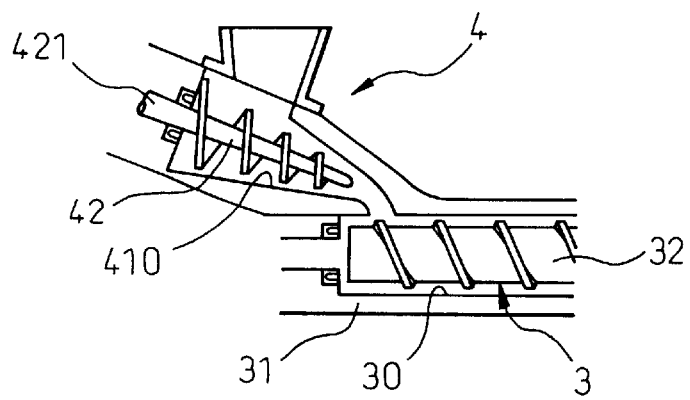
FIG. 6 is a view showing an arrangement of a material introduction portion according to a third embodiment of the present invention.

As can be seen in FIG. 6, also in the third embodiment, the arrangement of the material introduction portion 4 and the connection of the introduction passage 410 to the housing 31 in the first embodiment are modified. In the third embodiment, the introduction passage 410 of the material introduction portion 4 is connected to the housing 31 at the upper portion of the screw extruder 3, as can be seen in FIG. 6.

Moreover, the shaft portion 421 (431) of the introduction screw 42 (43) extends obliquely so that the front ends of the screws oriented in the downward direction and the engaging portion of the introduction screws is located above the axis of the extruding screw 32. The remaining structure of the third embodiment is the same as that of the first embodiment.

The same effects as those of the first embodiment can be obtained from the third embodiment.

<Fourth Embodiment>

Figure 7:
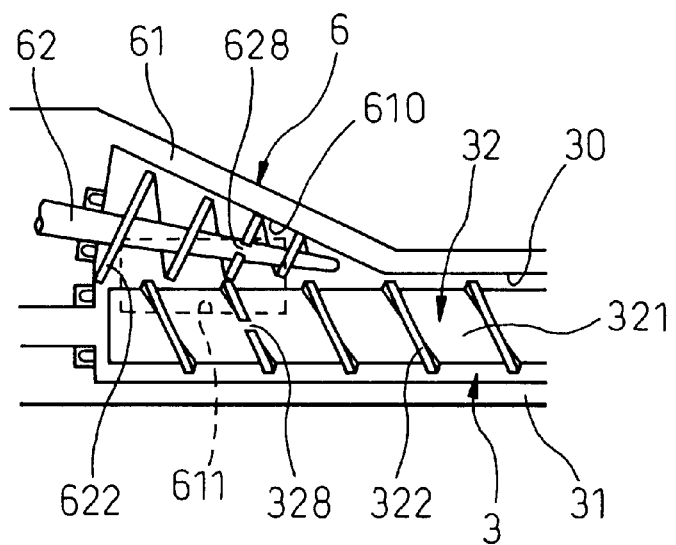
FIG. 7 is a plan view of an arrangement of a material introduction portion according to a fourth embodiment of the present invention.
Figure 8:
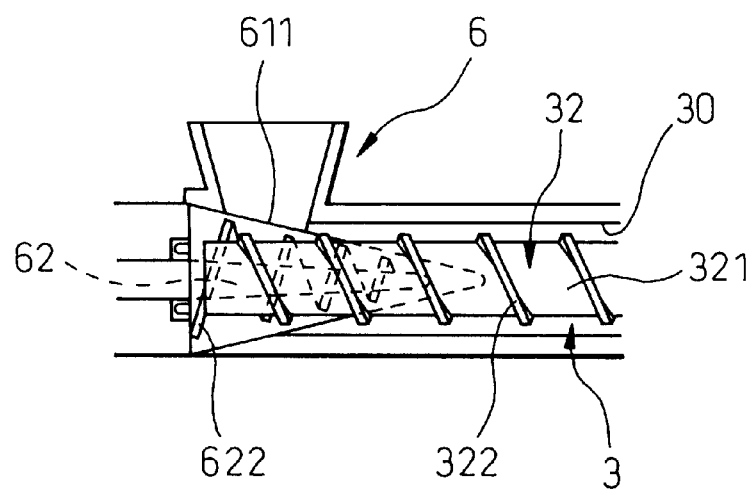
FIG. 8 is a side view of an arrangement of a material introduction portion according to a fourth embodiment of the present invention.

In this embodiment, as shown in FIGS. 7 and 8, the material introduction portion 4 in the first embodiment is replaced with a material introduction portion 6 having a single introduction screw 62. The structure other than the material introduction portion 6 is the same as that in the first embodiment.

Namely, as shown in FIGS. 7 and 8, the material introduction portion 6 of the fourth embodiment is provided with a casing 61 having an introduction passage 610 connected to the housing 31 of the upper stage screw extruder 3 and an opening 611 through which the ceramic material is charged, and a single introduction screw 62 provided in the introduction passage 610 of the casing 61.

The introduction screw 62 is in the form of a cone whose diameter is gradually reduced toward the front end. Moreover, the introduction screw 62 is provided with a lead 622 which is wound in the direction opposite to the lead 322 of the extruding screw 32. The extruding screw 32 is arranged so that the lead 622 is engaged with the lead 322 of the extruding screw 32 in a non-contacting state. The leads 622 and 322 rotate in the downward direction at the engaging portion thereof. Note that, in this embodiment, the lead 322 of the extruding screw 32 and the lead 622 of the introduction screw 62 are respectively provided with low thread portions 328 and 628 so as to prevent interference therebetween.

In this embodiment, the same effects as those of the previous embodiments in which two introduction screws are provided can be obtained. Furthermore, the single introduction screw 62 makes the structure of the material introduction portion 6 simple and compact.

To obtain the same capability as the first embodiment, it is necessary to lengthen the extruding screw 32 by a length corresponding to the engagement with the introduction screw 62. Moreover, both or one of the lead portions of the screws that would otherwise interfere with each other are provided with low portions so as to prevent the interference.

<Fifth Embodiment>

Figure 9:
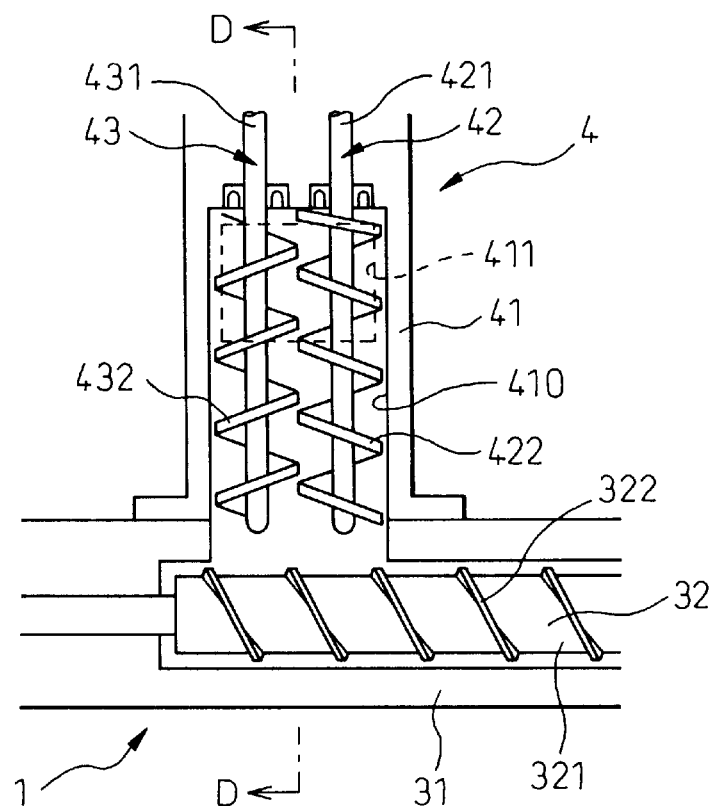
FIG. 9 is a view showing a structure of a material introduction portion according to a fifth embodiment of the present invention.
Figure 10:
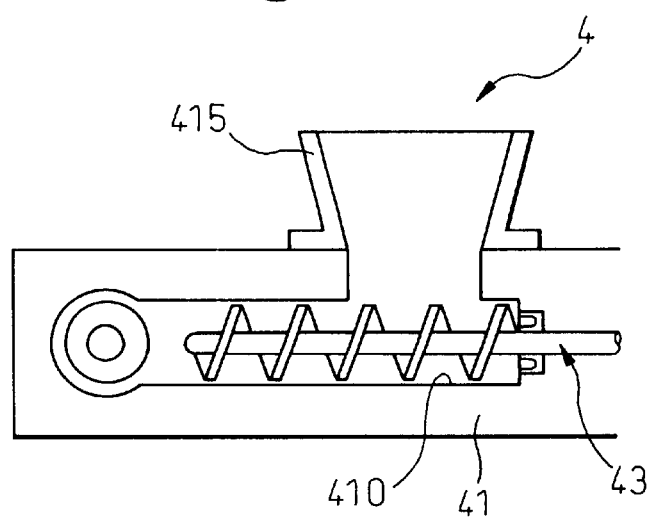
FIG. 10 is a sectional view taken along the line D—D in FIG. 9 in a fifth embodiment of the invention.

In a fifth embodiment, as shown in FIGS. 9 and 10, the material introduction portion 4 in the first embodiment is modified.

The basic structure of the material introduction portion 4 in the fifth embodiment is the same as that in the first embodiment and is provided with a casing 41 having an introduction passage 410 connected to the inside of the housing 31 of the screw extruder 3 and an opening 411 for charging the ceramic material, and a pair of right and left introduction screws 42 and 43 arranged in the introduction passage 410 in the casing 41.

The pair of introduction screws 42 and 43 are respectively provided with leads 422 and 432 which are wound in opposite directions. The screws 42 and 43 are arranged so that the leads 422 and 432 are engaged in a non-contacting state. The introduction screws 42 and 43 rotate in the downward direction at the engagement portion (to feed the ceramic material in a direction opposite to the opening 411).

The difference of the fifth embodiment from the first embodiment resides in the introduction screws 42 and 43 which are in the form of a cylinder having a uniform outer diameter, as shown in FIGS. 9 and 10, unlike the first embodiment in which the introduction screws are conical. The other structure in the fifth embodiment is the same as that of the first embodiment.

In the fifth embodiment, the amount of material to be charged in the material introduction portion 4 per unit time can be increased with respect to the prior art. Consequently, the molding speed of the honey-comb structure 8 can be increased, thus leading to an enhancement of the productivity.

<Sixth Embodiment>

In this embodiment as shown in FIGS. 11 through 14, the extrusion molding machine 1 in the first embodiment is modified in connection with the material introduction portion 4.

Namely, in this embodiment, the introduction passage 410 of the material introduction portion 4 is provided therein with baffle members 7 which project inwardly from the casing 41 so that the baffle members 7 are located between the lead portions 422 and 432 of the introduction screws 42 and 43.

Figure 13:
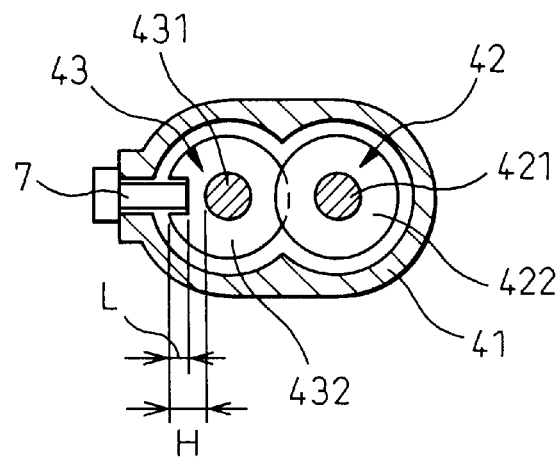
FIG. 13 is a sectional view taken along the line F—F in FIG. 12 in a sixth embodiment of the invention.

The baffle members 7 are each in the form of a circular rod. As shown in FIG. 13, assuming that the height of the threads of the lead portions 422 and 432 is H, the overlapping length L of the baffle members 7 and the lead portions 422 and 432, as viewed in the axial direction of the screws 42 and 43, is identical to one third of the height H.

Figure 11:
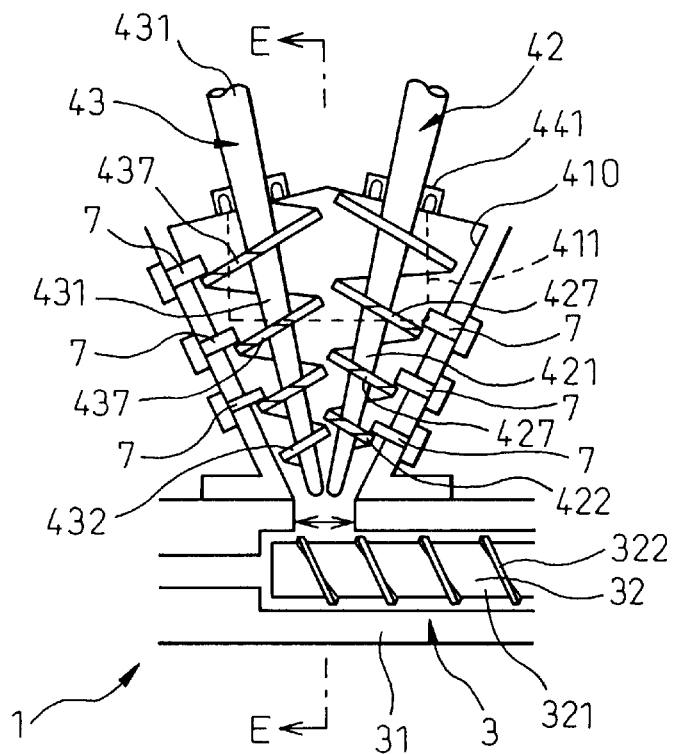
FIG. 11 is a view showing a structure of a material introduction portion according to a sixth embodiment of the present invention.
Figure 12:
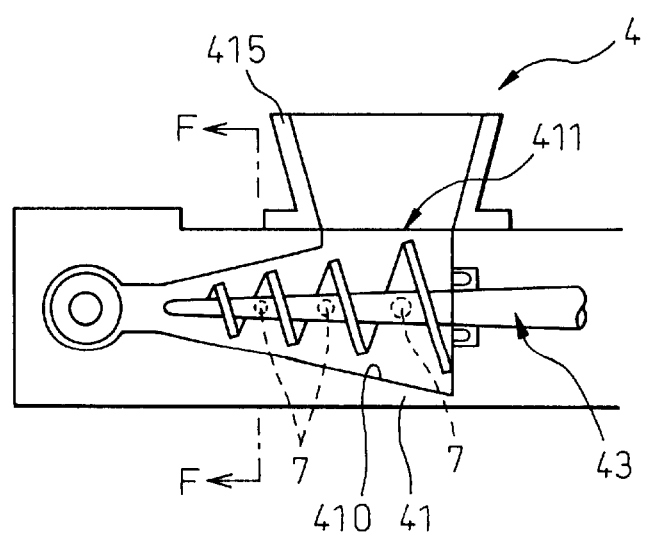
FIG. 12 is a sectional view taken along the line E—E in FIG. 11 in a sixth embodiment of the invention.
Figure 14:
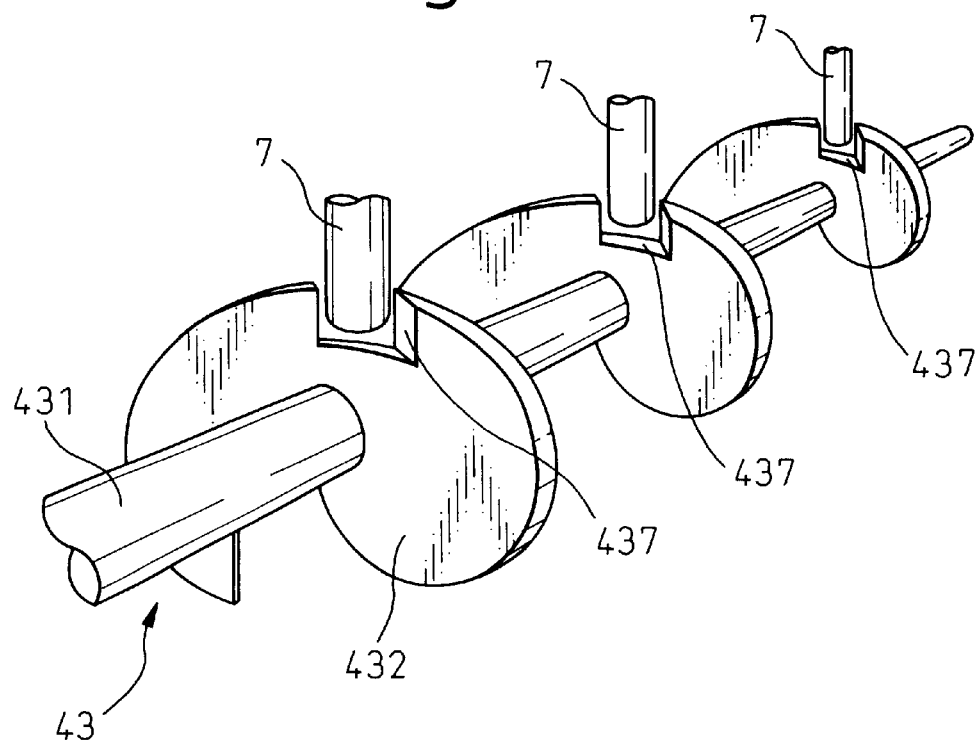
FIG. 14 is a view showing a positional relation between an introduction screw and baffle members in a sixth embodiment of the present invention.

As shown in FIGS. 11, 12 and 14, the baffle members 7 are spaced at a distance equal to the pitch of the threads of the adjacent lead portions 422 and 432.

As shown in FIGS. 11 and 14, the lead portions 422 and 432 are provided with cut-away portions 427, 437 corresponding to the baffle members 7 so as not to prevent the rotation of the introduction screws 42 and 43 by the baffle members 7. When the rotation of the introduction screws 42 and 43 takes place, the cut-away portions 427 and 437 prevent the lead portions 422 and 432 from coming into contact with the baffle members 7 and ensures smooth rotation of the introduction screws 42 and 43.

The baffle members 7 scrape the ceramic material 80 between the lead portions 422 and 432 when the ceramic material is fed through the material introduction portion 4. Consequently, it is possible to prevent the ceramic material 80 from remaining between the lead portions 422 and 432. Thus, the ceramic material 80 can be certainly fed forward.

As mentioned above, in this embodiment, the overlapping length L of the baffle members 7 and the lead portions 422 and 432 is ⅓ of H. Consequently, not only can the sufficient ceramic material 80 scraping effect of the baffle members 7 be obtained, but also the sufficient propelling force of the ceramic material 80 caused by the rotation of the introduction screws 42 and 43 can be secured.

Except for the above-mentioned effects, the same effects as those in the first embodiment can be also obtained in the sixth embodiment.

<Seventh Embodiment>

Figure 15:
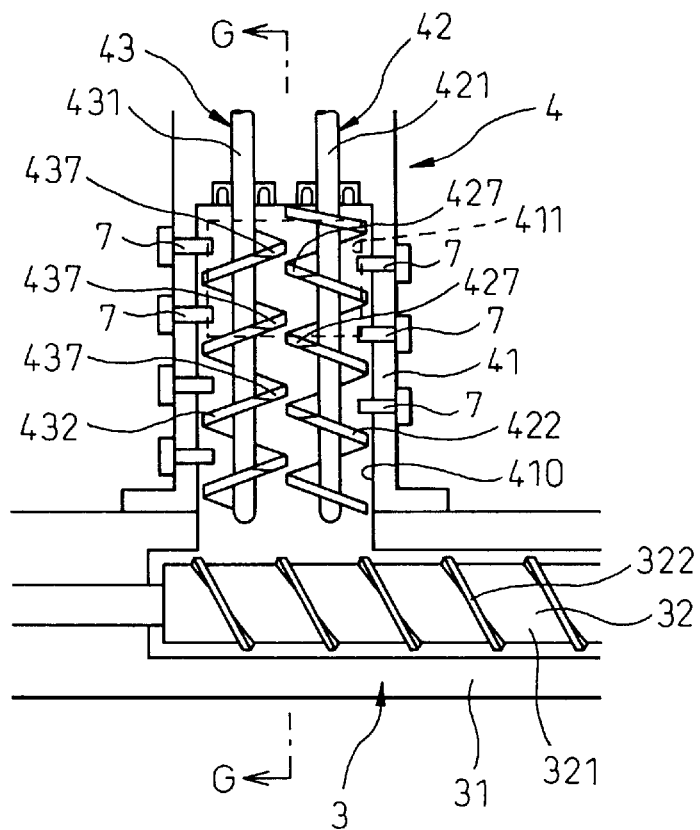
FIG. 15 is a view showing a structure of a material introduction portion according to a seventh embodiment of the present invention.
Figure 16:
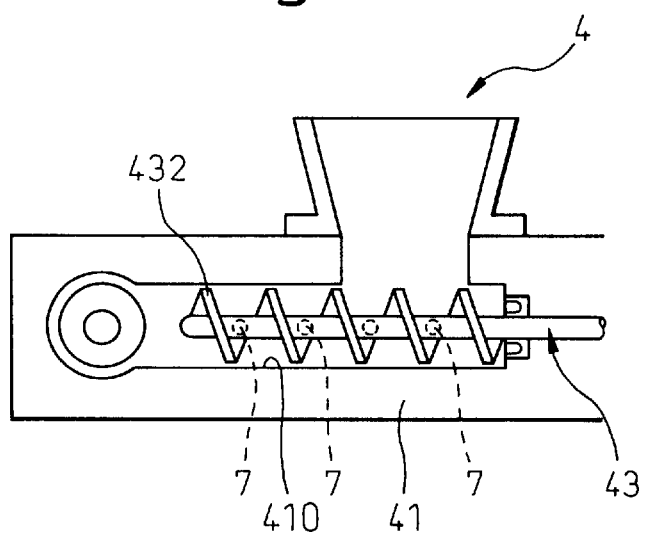
FIG. 16 is a sectional view taken along the line G—G in FIG. 15 in a seventh embodiment of the invention.
Figure 17:
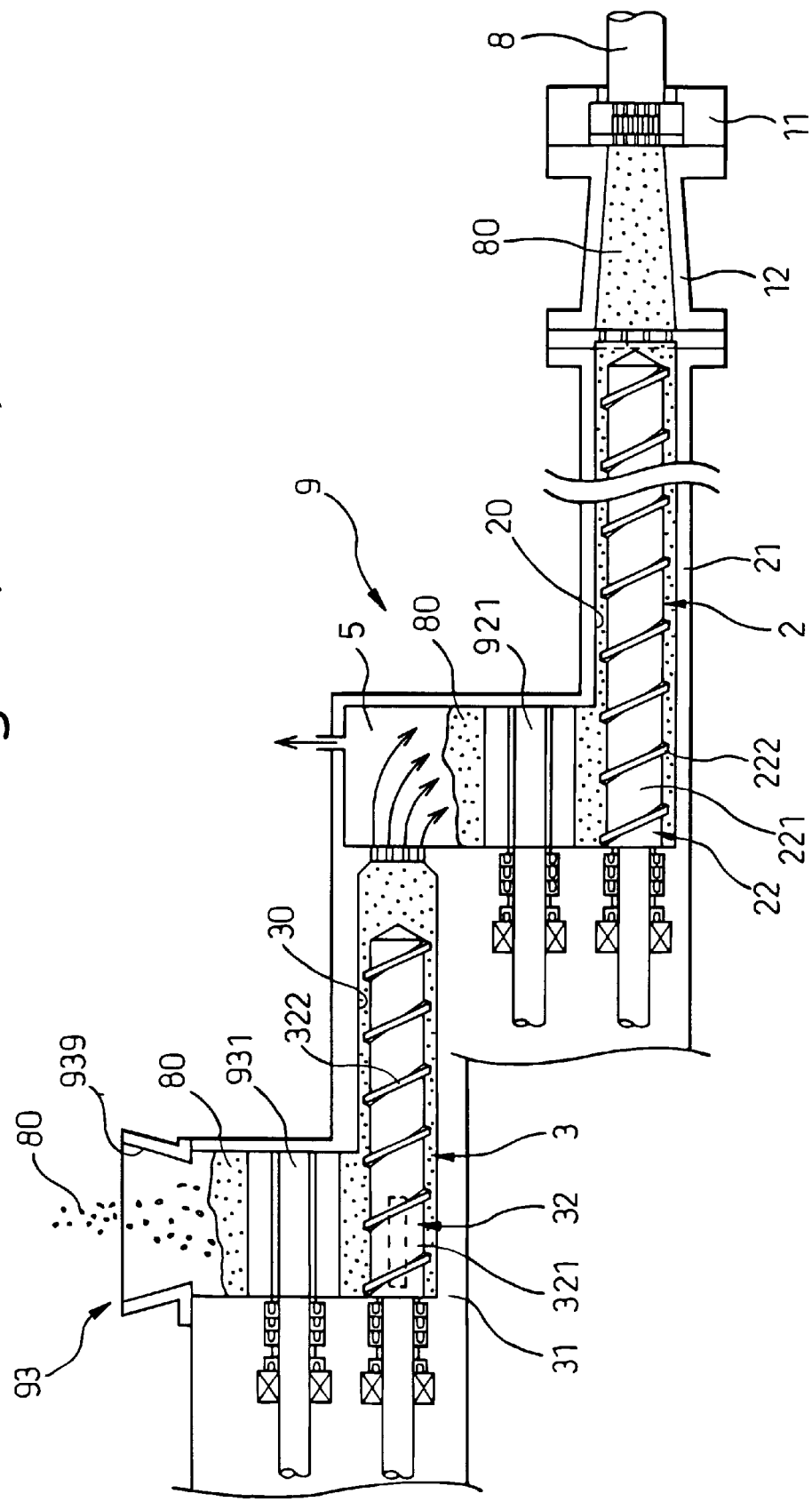
FIG. 17 is a view showing an entire structure of a extrusion molding machine in the prior art.
Figure 18:
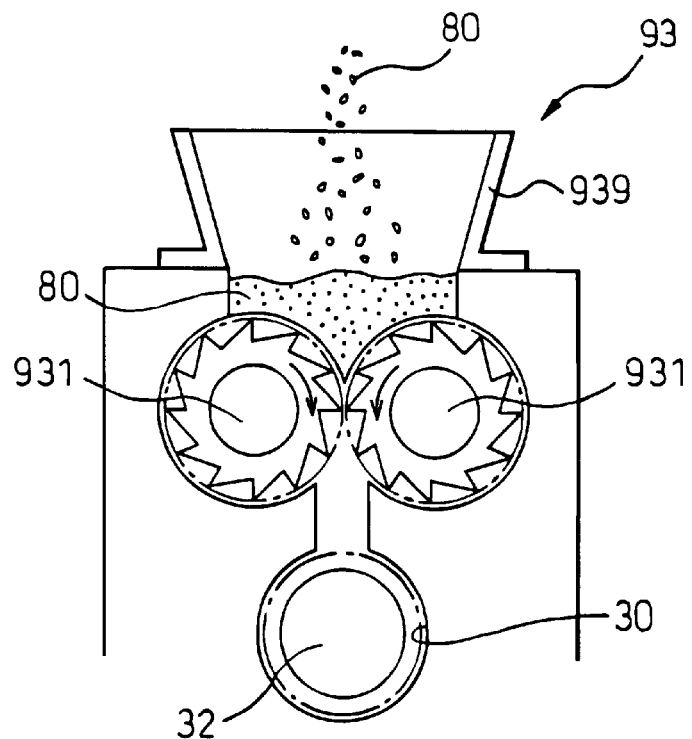
FIG. 18 is a view showing a structure of a material introduction portion in the prior art.

In this embodiment, the extrusion molding machine 1 in the fifth embodiment is modified as shown in FIGS. 15 and 16. The introduction passage 410 of the material introduction portion 4 is provided therein with the baffle members 7 which project inward from the casing 41 so that the baffle members 7 are located between the adjacent lead portions 422 and 432 of the introduction screws 42 and 43.

In this embodiment, the baffle members 7 are each in the form of a circular rod. Similar to FIG. 13, assuming that the height of the threads of the lead portions 422 and 432 is H, the overlapping length L of the baffle members 7 and the lead portions 422 and 432, as viewed in the axial direction of the screws 42 and 43, is identical to one third of the height H.

As shown in FIGS. 15 and 16, the baffle members 7 are spaced at a distance equal to the pitch of threads of the adjacent lead portions 422 and 432.

As shown in FIG. 15, the lead portions 422 and 432 are provided with cut-away portions 427, 437 corresponding to the baffle members 7 so as not to prevent the rotation of the introduction screws 42 and 43 by the baffle members 7. The remaining structure in the seventh embodiment is the same as that of the fifth or sixth embodiments.

In this embodiment, the same effects as those in the sixth embodiment can be also obtained.

While the invention has been described by reference to specific embodiments chosen for purpose of illustration, it should be apparent that numerous modifications could be made thereto by those skilled in the art without departing from the basic concept and scope of the invention.

What is claimed is:

1. An extrusion molding machine for producing a ceramic molding, comprising a screw extruder having a housing and an extruding screw incorporated in the housing and provided with a shaft portion and a lead portion spirally wound about the shaft portion, and a material introduction portion which is adapted to introduce a ceramic material into the screw extruder, wherein the material introduction portion is provided with a casing which has an introduction passage connected to the inside of the housing of the screw extruder and an opening through which the ceramic material is charged, and a single introduction screw provided in the introduction passage, said introduction screw being in the form of a cone whose diameter is gradually reduced toward the front end thereof and being provided with a lead portion wound in a direction opposite to the lead portion of the extruding screw, said introduction screw being arranged, so that the lead portion of the introduction screw is engaged by the lead portion of the extruding screw substantially in a non-contact state at an engagement portion, said introduction screw and said extruding screw being rotated so that the ceramic material is moved in a direction opposite to the opening at the engagement portion.

2. An extrusion molding machine for producing a ceramic molding, according to claim 1, wherein the lead portion of the extruding screw and the lead portion of the introduction screw are respectively provided with low thread portions so as to prevent interference therebetween.

3. An extrusion molding machine for producing a ceramic molding, according to claim 1, wherein baffle members are provided in the introduction passage of the material introduction portion, the baffle members projecting inward from the casing so that the baffle members are located between the threads of the lead portions of the introduction screw.

4. An extrusion molding machine for producing a ceramic molding, according to claim 3, wherein where the height of the threads of the lead portion is H, the overlapping length L of the baffle members and the lead portion, as viewed in the axial direction of the introduction screw, is in the range between 0.1H and 0.8H.

5. An extrusion molding machine for producing a ceramic molding, according to claim 3, wherein the baffle members are spaced at a distance equal to the pitch of the adjacent threads of the lead portion.

6. An extrusion molding machine for producing a ceramic molding, according to claim 3, wherein the baffles comprise circular rods.

7. An extrusion molding machine for producing a ceramic molding, according to claim 3, wherein the baffles comprise square rods.

8. An extrusion molding machine for producing a ceramic molding, according to claim 3, wherein at least one of the baffles is formed from a flexible rubber.

9. An extrusion molding machine for producing a ceramic molding, according to claim 3, wherein at least one of the baffles is formed from a rigid metal.

* * * * *